Figure 1:
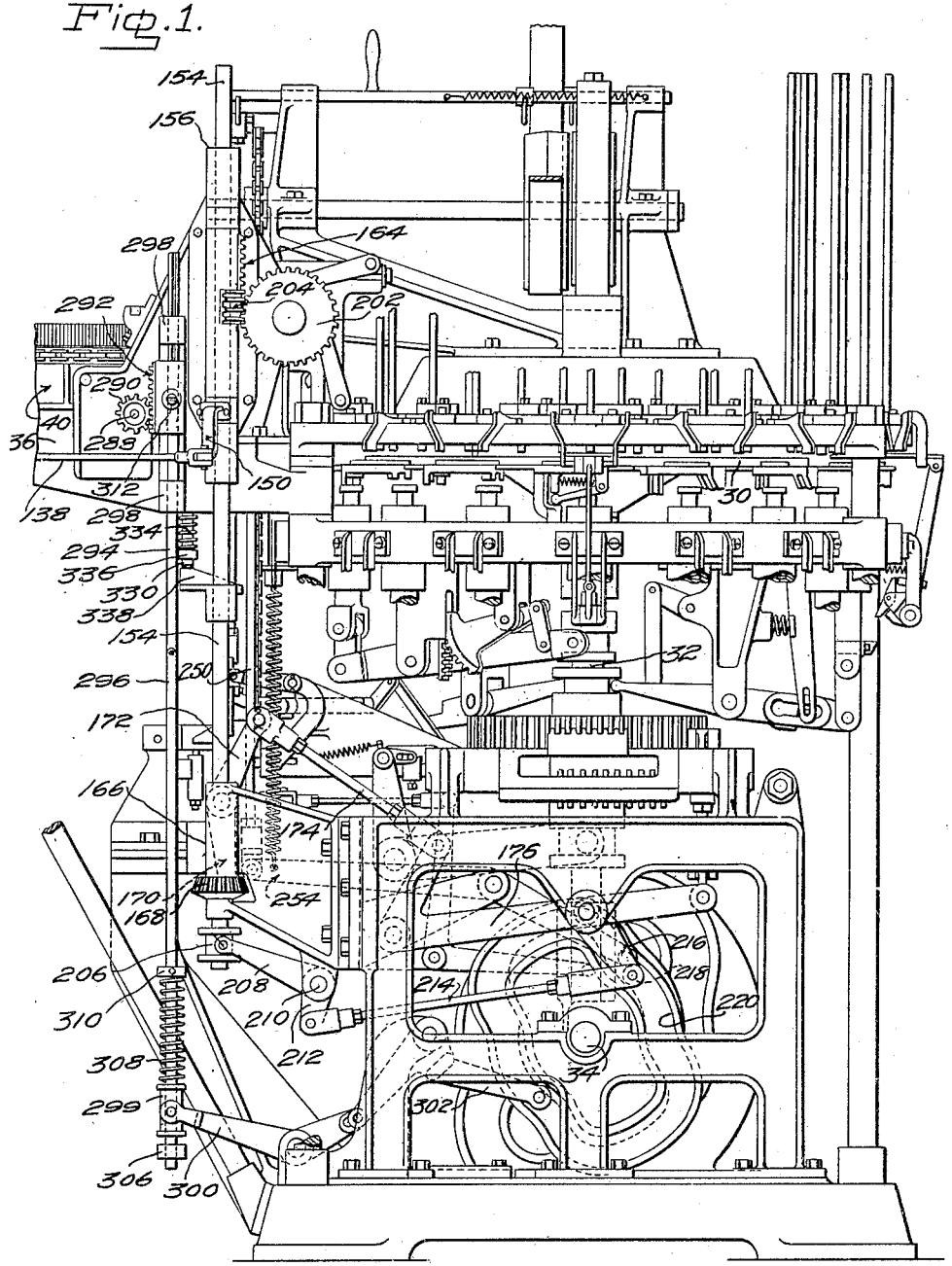

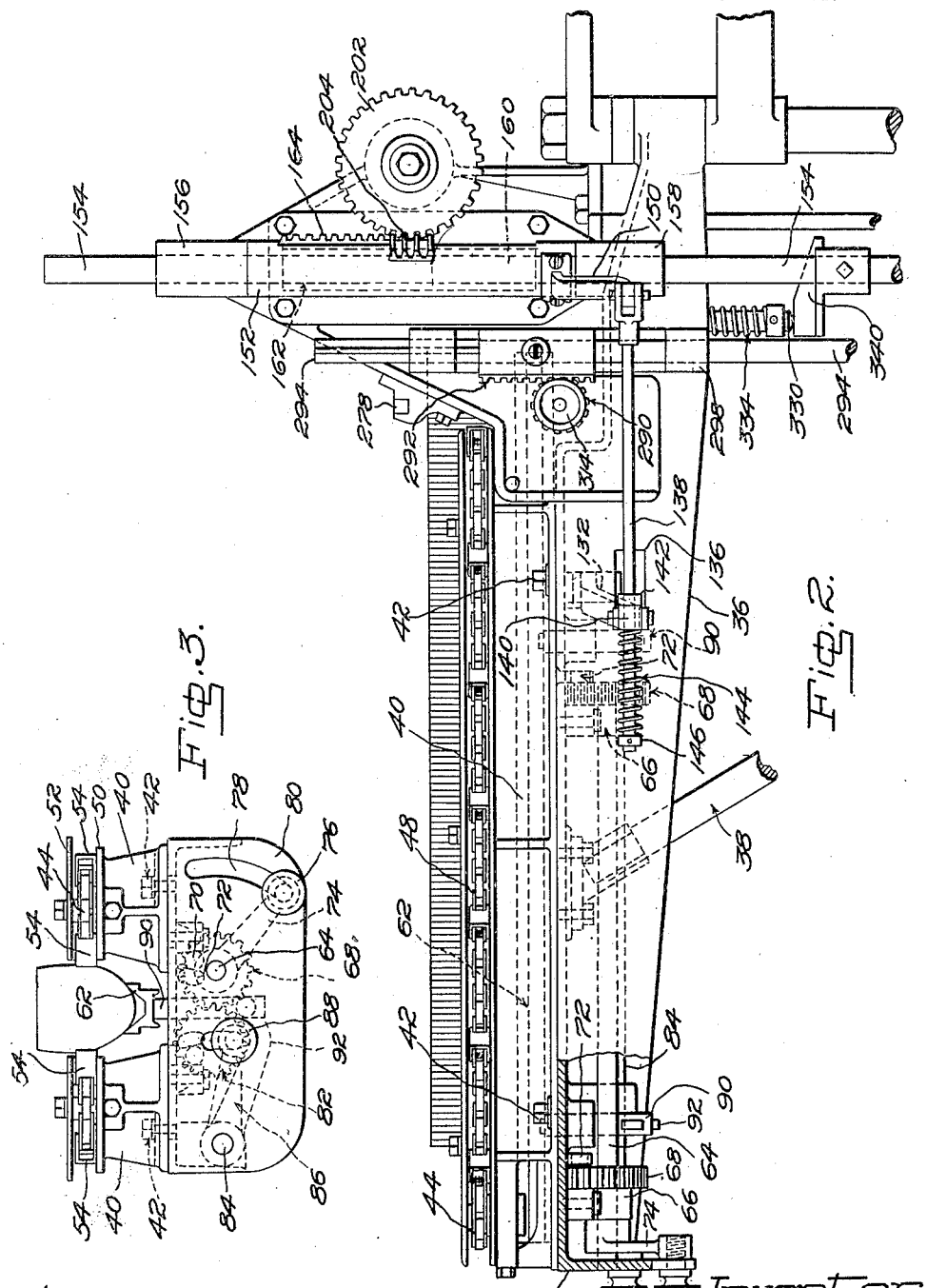

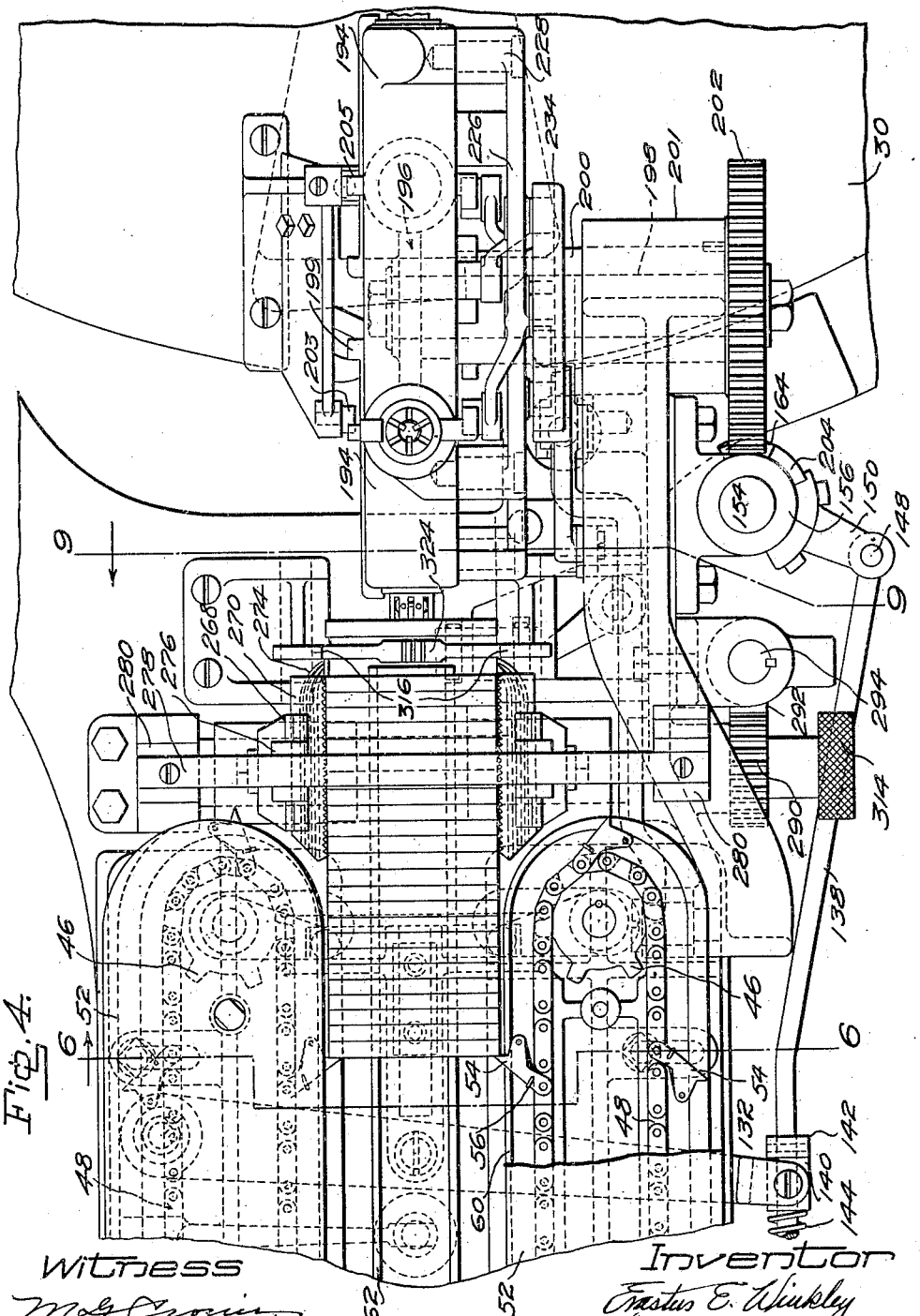

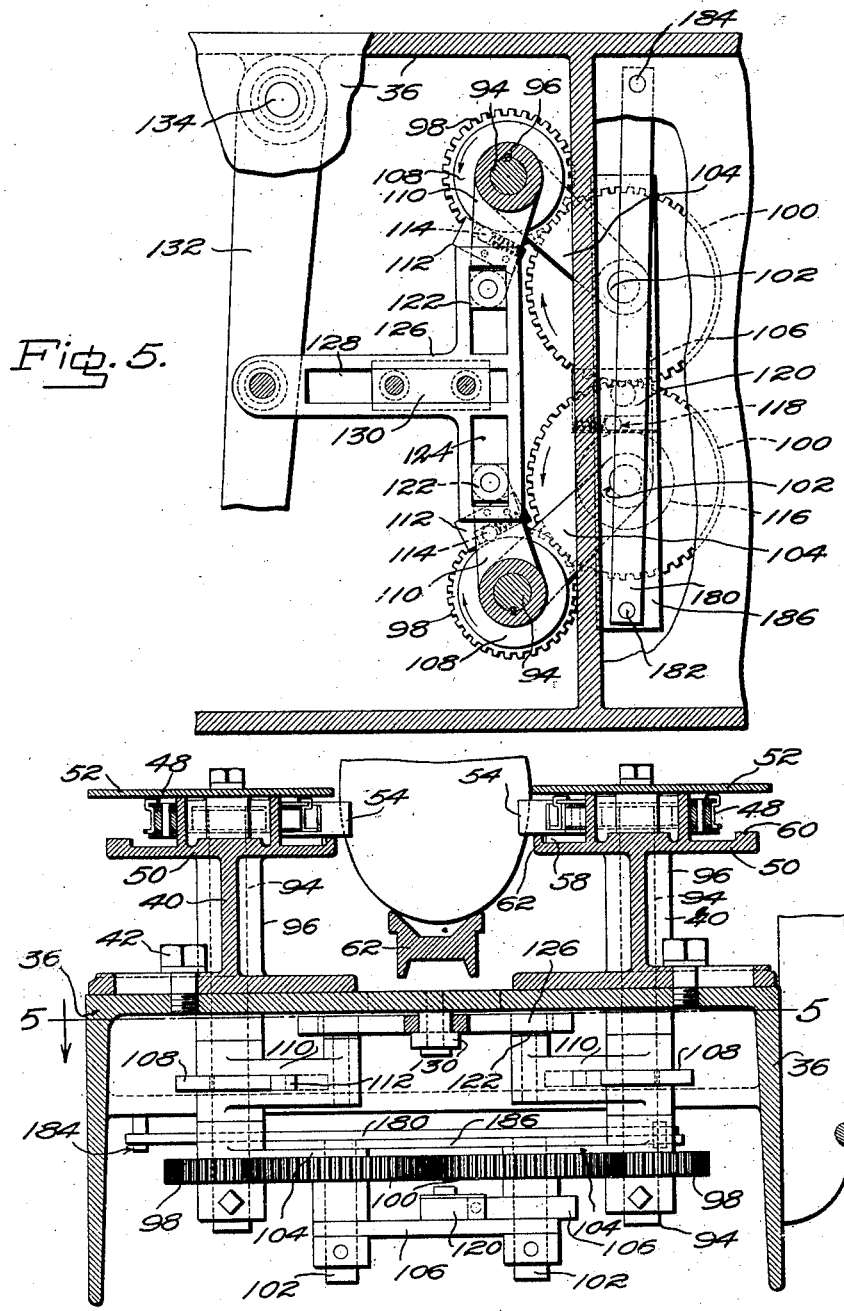

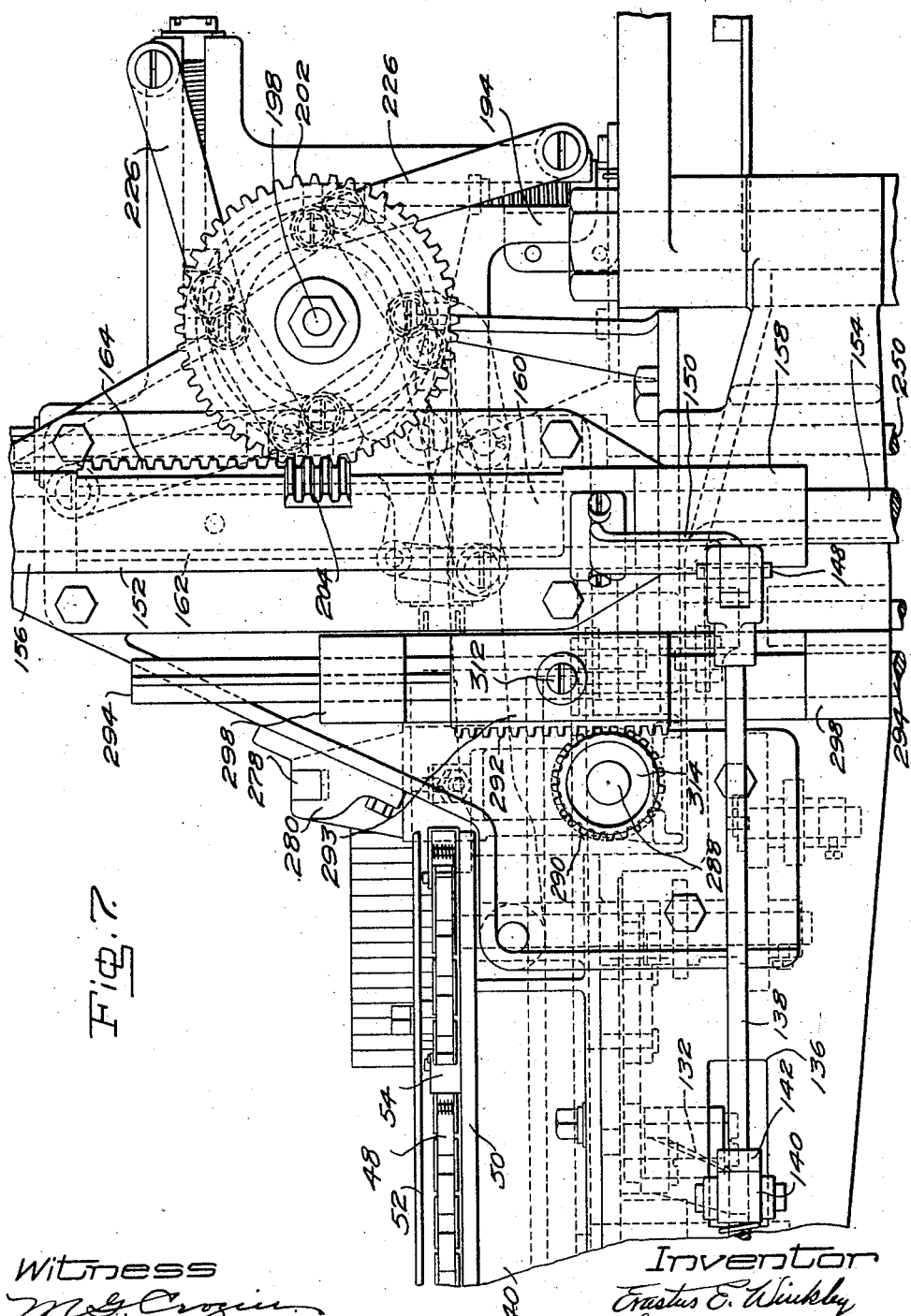

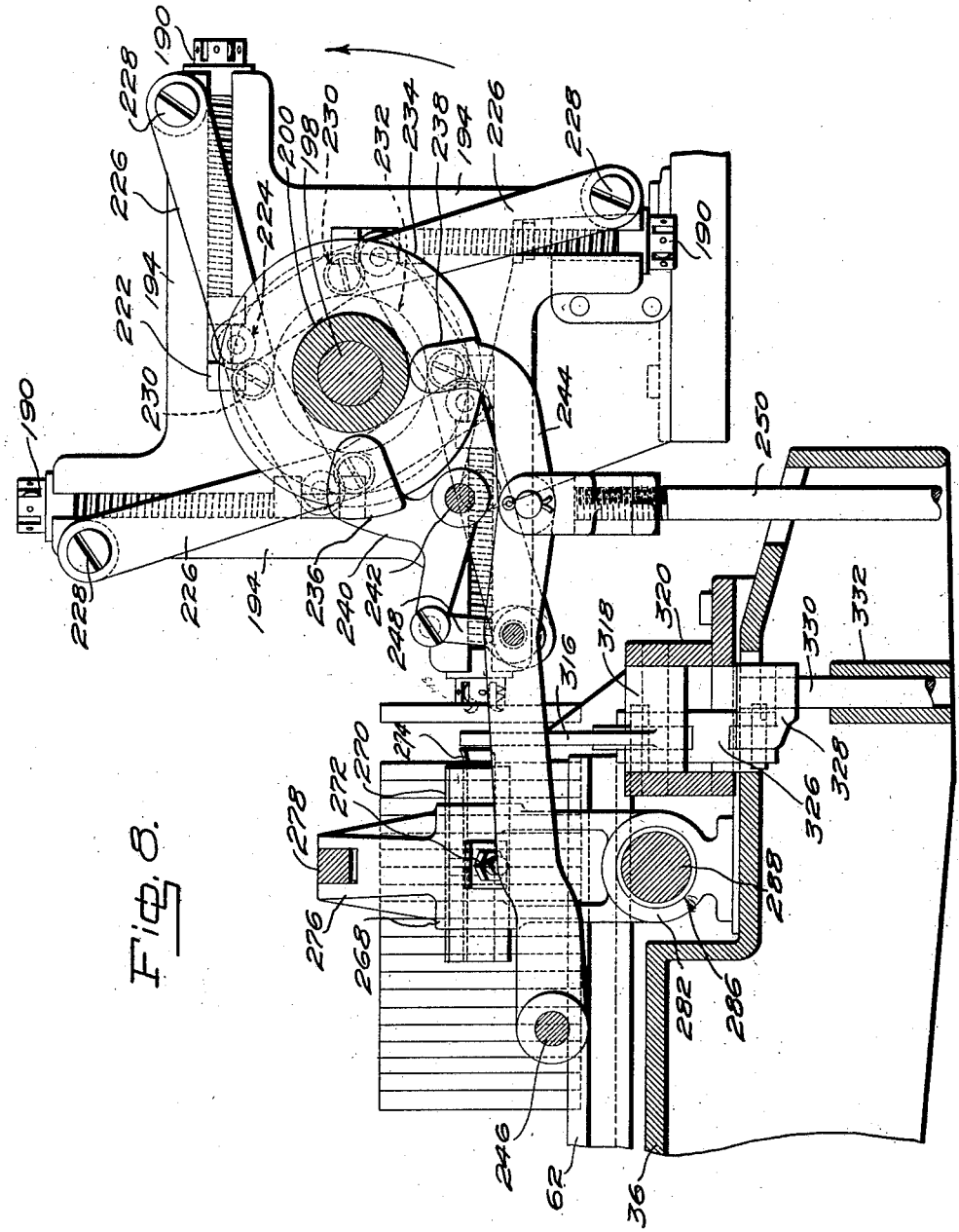

E. E. WINKLEY.
FEED MECHANISM.
APPLICATION FILED DEC. 12, 1917.

1,368,312.

Patented Feb. 15, 1921.
9 SHEETS—SHEET 7

Witness

Inventor

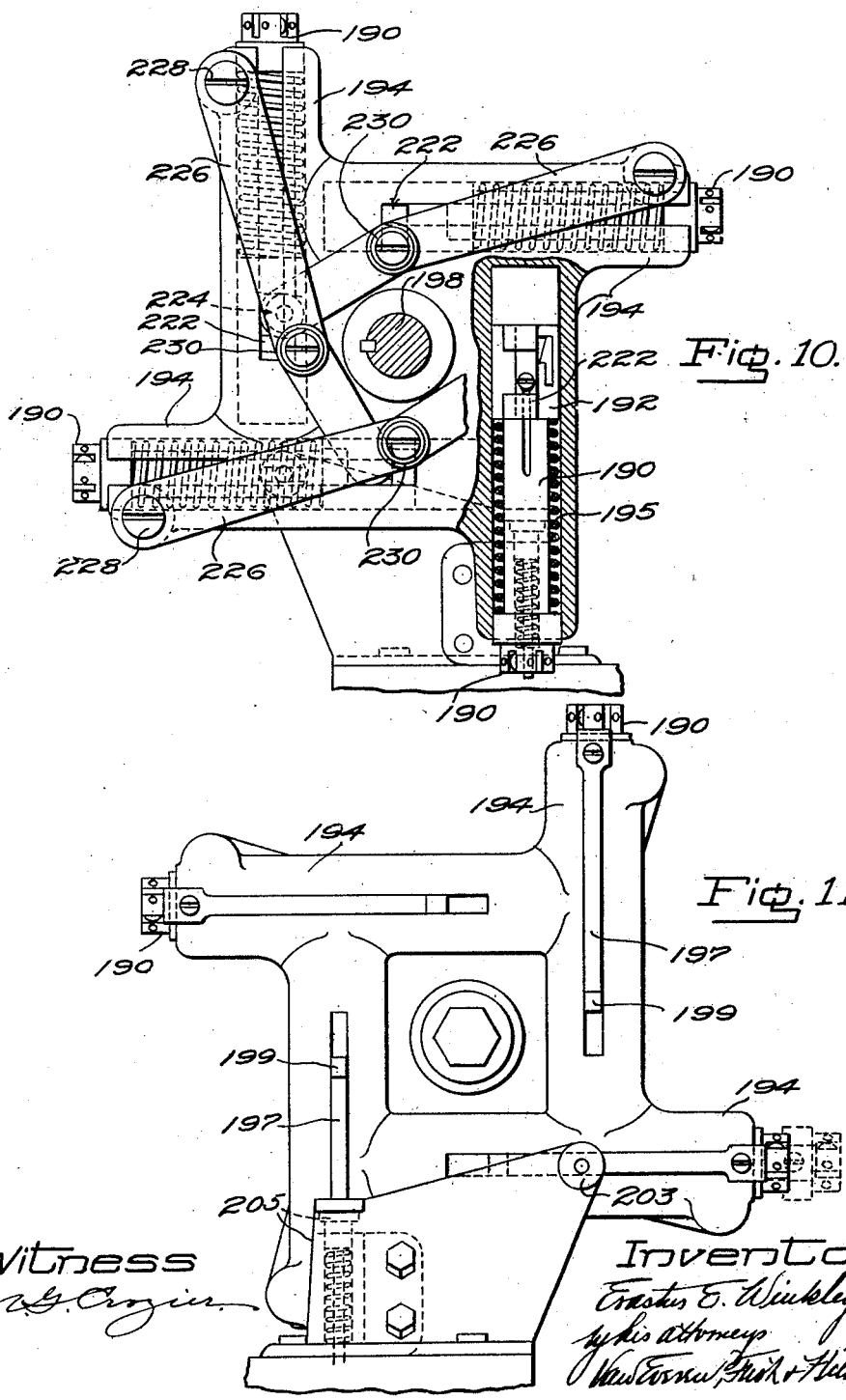

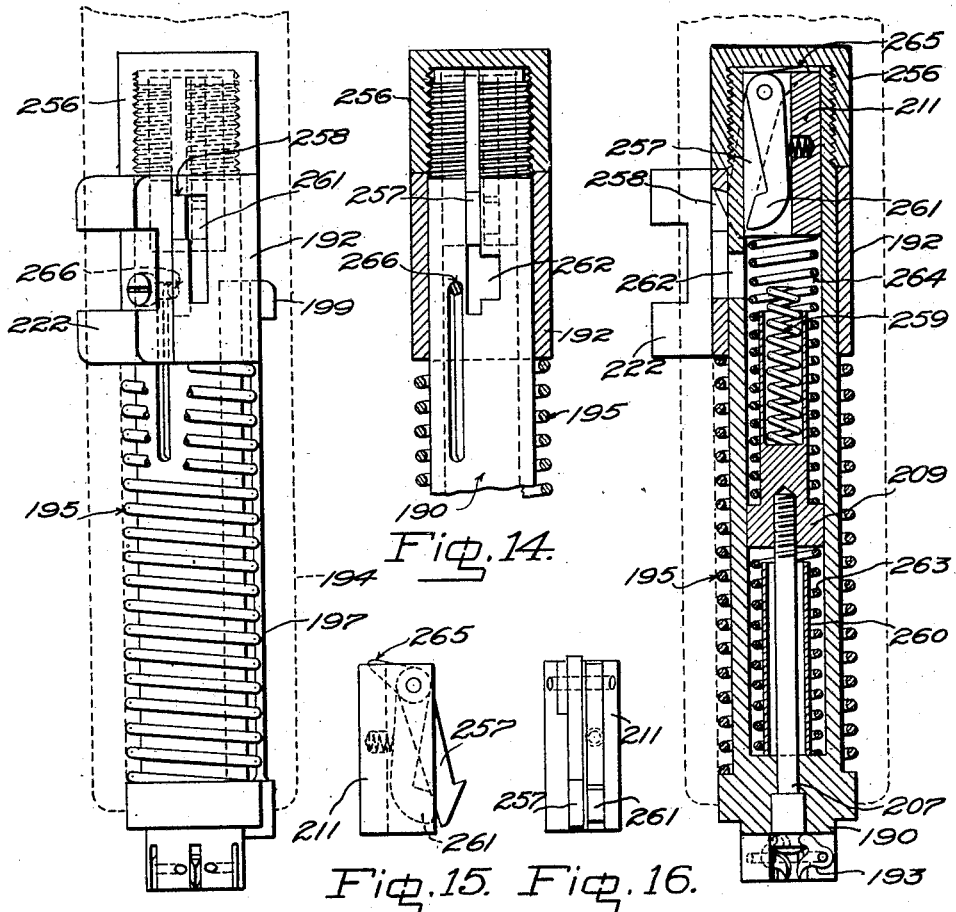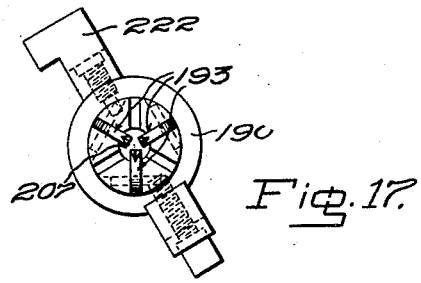

UNITED STATES PATENT OFFICE.

ERASTUS E. WINKLEY, OF LYNN, MASSACHUSETTS, ASSIGNOR TO UNITED SHOE MACHINERY CORPORATION, OF PATERSON, NEW JERSEY, A CORPORATION OF NEW JERSEY.

FEED MECHANISM.

1,368,312.      Specification of Letters Patent.      Patented Feb. 15, 1921.

Original application filed January 24, 1916, Serial No. 73,899. Divided and this application filed December 12, 1917. Serial No. 206,784.

*To all whom it may concern:*

Be it known that I, ERASTUS E. WINKLEY, a citizen of the United States, residing at Lynn, in the county of Essex and State of Massachusetts, have invented certain new and useful Improvements in Feed Mechanisms; and I do hereby declare the following to be a full, clear, and exact description of the invention, such as will enable others skilled in the art to which it appertains to make and use the same.

This invention relates to mechanisms for automatically feeding heel-lifts or other pieces of shoe stock, and it is applicable particularly to machines for sorting or grading such pieces in accordance with their mass, thickness or other characteristics, although, broadly considered, the invention is adapted for general utility in feeding pieces of various kinds and for many different purposes.

The present invention is an improvement on the machine for sorting or grading pieces of shoe stock illustrated and described in Letters Patent of the United States, No. 1,234,433, granted February 24, 1917, to me.

One object of the invention is to improve the means by which the pieces of shoe stock are supplied or fed to the working instrumentalities of the machine. In order that the pieces may be presented all in substantially the same position, they are most conveniently arranged at a supply station in stack formation, and in accordance with the present invention, novel and effective means are employed for holding such a stack, these means being adapted to permit the convenient addition of pieces at any time, to the rear end of the stack, without interference with the continued feeding of lifts from the forward end of the stack. For this purpose, continuously acting conveyers are employed, these conveyers having pawls or abutments, which act to move the pieces forwardly but which will yield to permit additional pieces to be inserted between them. The feed-mechanism further comprises novel clamping devices for retaining the foremost pieces of the stack while one of them is being engaged by the transferring devices. Other features of the feed-mechanism reside in novel means for actuating and adjusting the same.

Another object of the invention is to provide efficient and reliable means for transferring pieces, from the stack in which they are fed, to the carrier by which they are transferred to the various instrumentalities of the machine. To this end, I employ means which are adapted to hold the pieces positively and to turn them from the vertical position, which they occupy in the stack, to the horizontal position which they occupy in the carrier; and I further employ a series of such devices arranged circularly so that they may operate with an intermittent rotary movement.

Other objects of the invention, and the features of construction by which they are carried out, will be noted hereafter in connection with the description of the illustrated embodiment of the invention.

Figure 9:
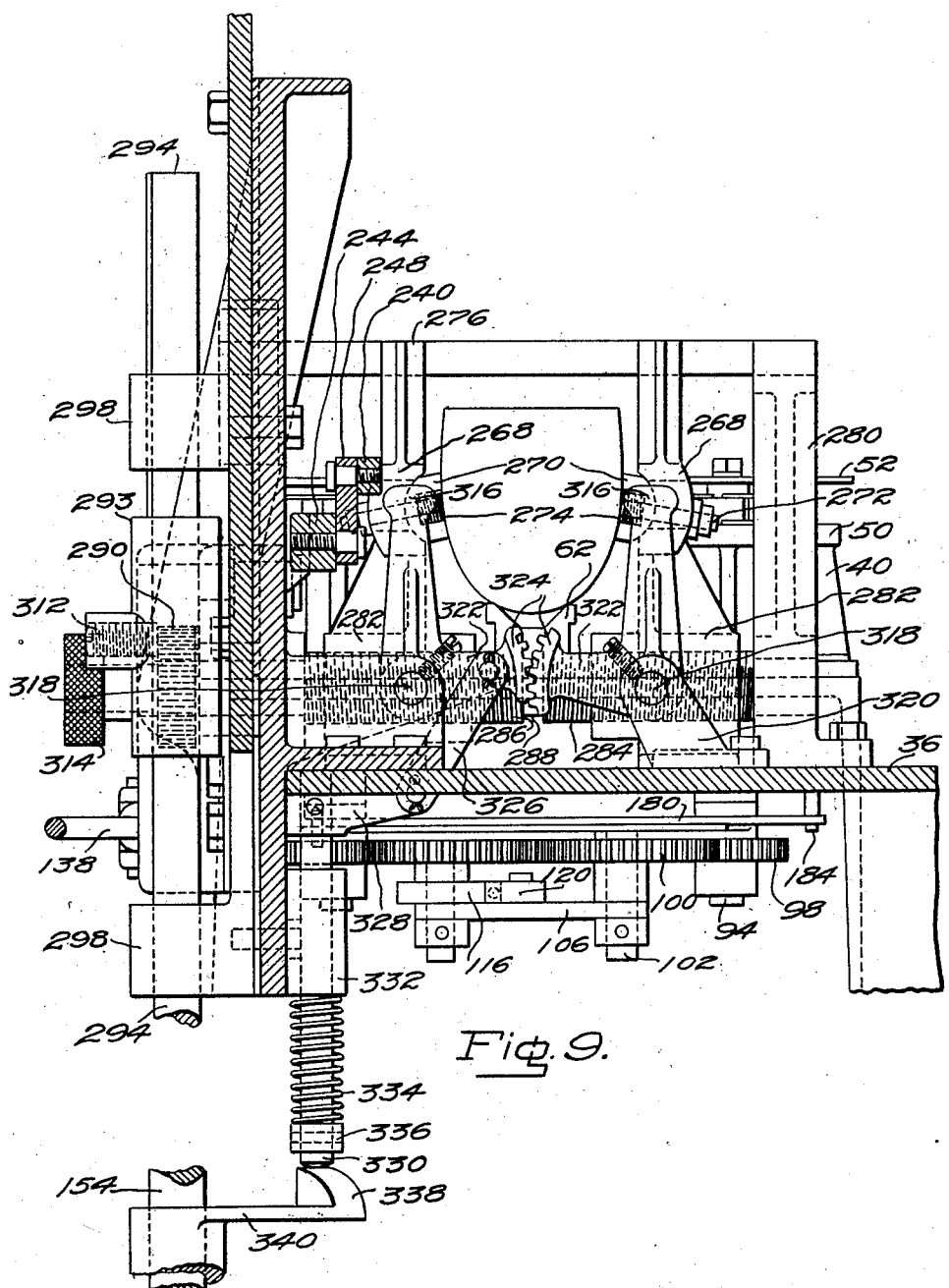

The preferred form of the invention, as applied to a machine for sorting or grading heel-lifts, is illustrated in the accompanying drawings, in which Figure 1 is a view in side elevation of a machine embodying the feed-mechanism of the present invention, only a portion of the feed-table being shown; Fig. 2 is an enlarged view, partially in section and partially in side elevation, of the entire feed-table and the parts associated therewith, which are illustrated only in part in Fig. 1; Fig. 3 is a view in rear elevation of the apparatus shown in Fig. 2; Fig. 4 is a plan view of the front portion of the feed-table, together with the lift pickers and the means for actuating them; Fig. 5 is a plan view, sectioned on the line 5—5 of Fig. 6, of a portion of the mechanism for actuating the conveyers on the feed-table; Fig. 6 is a view, partially in section and partially in elevation, of the feed-table and the actuating mechanism for the conveyers, the section being taken on the line 6—6 of Fig. 4; Fig. 7 is an enlarged view, in side elevation, of a portion of the feed mechanism, including particularly the feed-table, the means for actuating the lift-clamps and the pickers; Fig. 8 is a view, partially in side elevation and partially in section of a portion of the feed mechanism, and illustrates particularly the lift-clamps, the pickers and the picker actuating mechanism; Fig. 9 is an enlarged view, partially in section and partially in front elevation, taken approximately on the line 9—9 in Fig. 4; Fig. 10 is an enlarged view, partially in section and partially in side elevation, of the picker mechanism, including part of the cam mechanism for actuating it; Fig. 11 is a view in elevation looking at the opposite side of the apparatus shown in Fig. 10; Fig. 12 is a side elevation, looking in a diagonal direction, of certain parts of the interior mechanism of one of the pickers; Fig. 13 is a sectional view of a transverse section plane of the same parts as shown in Fig. 12 looking from the rear; Figs. 14, 15 and 16 are fragmentary views in side elevation of certain details of the picker mechanism; and Fig. 17 is an end view of the mechanism of one of the pickers.

The invention is illustrated as embodied in a machine for sorting heel-lifts, the sorting mechanism being similar in its construction and in the operation performed by it, to the machine disclosed and claimed in Patent No. 1,270,476 granted to me June 25, 1918, of which this application is a division. Accordingly, the machine will not be described herein in its entirety, but only so far as is necessary for an understanding of those parts which pertain to the feed-mechanism.

In the embodiment of the invention illustrated in the drawings, and like the machine of the said patent, the present machine is provided with a rotary heel-lift carrier 30 in the form of a circular plate (Figs. 1 and 4) which turns upon a vertical shaft 32 at the center of the machine. The shaft 32 is journaled in frame members above and below the carrier as in my earlier machine. On this carrier, the lifts are conveyed, from the mechanism by which they are fed singly to the carrier, to and past the operative instrumentalities of the machine, and then to a series of lift-holders into which the lifts are discharged and stacked selectively according to the characteristic in accordance with which they are sorted. The carrier 30 is rotated with a step-by-step movement, by mechanism which, together with various other mechanisms in the machine, are actuated by cams mounted on and rotated by a horizontal cam-shaft 34 near the bottom of the machine to which power is suitably supplied.

The machine is provided, at the front, with a flat-topped feed-table 36 (Figs. 1 and 2) fixed at its forward end to the frame of the machine, and supported, near the rear, by a brace-rod 38 extending to the base of the machine. The lifts are supported, in a horizontally arranged stack, above the feed-table, and are engaged and supported laterally, and also advanced upon the table, by two endless-chain conveyers. These conveyers are mounted on two frames 40 (Fig. 3) which are seated on the top of the feed-table and are normally fixed thereon by clamp-screws 42 passing through the flanges at the bases of the conveyer-frames. Each frame 40 is provided with sprocket-wheels 44 and 46 (Figs. 2 and 4) at its front and rear ends, respectively, about and upon which the conveyer-chains 48 are supported in horizontal planes. Each conveyer-frame is also provided with lower and upper guard-plates 50 and 52 (Fig. 6) between which the chain moves.

The conveyer-chains do not directly engage the heel-lifts, but are each provided, for this purpose, with a series of abutments in the form of pointed pawls 54. As best shown in Fig. 4, these pawls are pivoted upon the chain-links, and are provided with springs 56 tending to swing them outwardly from the chain. Each pawl is provided, however, with a roller 58 which engages a peripheral flange 60 (Fig. 6) on the guard-plate 50, and thus limits the outward swinging movement of the pawl. The flange 60 is narrow at the inner side of the conveyer, which permits the pawls to project beyond it into position to engage with the heel-lifts, while at the outer side of the conveyer the flange is deeper and the guard-plate 52 also extends farther beyond the conveyer-chain, so that during the return-movement of the pawls, at the outer stretch of the conveyer, they are entirely shielded by the guard-plates.

During the feeding operation, the series of pointed pawls or abutments engage the sides of the lifts; that is, they either engage the lateral margins of the rear sides of the lifts that are directly in advance of them, or the pointed ends of the pawls coöperate with the lateral edges of the lifts to which they are immediately adjacent. The particular character of the engagement of the pawls with the lifts is entirely dependent upon the chance positions of the lifts with respect to the pawls, and is, therefore, largely accidental. Manifestly, any lift may even be engaged at its rear margin on one side and at its lateral edge on the other, although the rearmost lift in the stack will probably be advanced by marginal engagement on both sides.

Whatever be the character of engagement, each set of oppositely disposed pawls functions to engage the lift in immediate proximity thereto and to advance it and the group of lifts in the stack between it and the next preceding set of pawls. Each group of lifts intermediate the several sets of pawls is, therefore, actuated independently and will remain either loosely or tightly stacked throughout the feeding operation, as the case may be; at least, until the particular group reaches a position in which it is acted upon by the pickers.

In the appended claims, the term "sides" as applied to the lifts or stack, is used as generic to include both the lateral margins of the lifts as well as the lateral edges of the lifts or stack.

The heel-lifts are supported from beneath by a channel-shaped support 62 (Figs. 3, 4 and 6), the heel-lifts being arranged with their back-edges resting upon this support. It will be apparent that the stack of lifts is readily accessible from the top, since there are no parts above the lifts to obstruct such access (see Fig. 2), and, therefore, the operator of the machine may readily correct any derangements which may occur in the position of the several lifts in the stack, or may, if necessary, remove any lifts which are so defective as to interfere with the operation of the machine. The arrangement of the conveyer-chains and the feed-pawls is such that the operator may also introduce lifts to the stack at any time without interrupting the operation of the machine. For this purpose it is necessary merely to press the lifts forwardly upon the support 62 and between the conveyer-chains and into engagement with the rearmost lift already in the stack. When this is done, the feed-pawls swing inwardly and yield to the introduction of the lifts, which may be tightly compacted during the filling operation, or may be loosely assembled in accordance with the manner in which they are introduced by the operator. The continuous feed of the lifts already in the stack is, however, maintained without interruption, inasmuch as the relationship of the operative pawls with respect to the stack remains substantially undisturbed. The additional lifts are at once engaged at their lateral margins or edges, as the case may be, and are advanced or fed in the manner hereinbefore described.

In order that the machine may be readily adjusted to operate upon lifts of different sizes and proportions, it is necessary to move the conveyers toward and from each other so as to vary the distance between them, it being desirable, however, that the center-line of the stack of lifts be always in the same relation to the other instrumentalities of the machine. Accordingly, means are provided for moving the conveyer-frames 40 toward and from each other in unison. For this purpose, a rock-shaft 64 (Figs. 2 and 3) is journaled longitudinally with respect to the feed-table, in bearings 66 projecting downwardly therefrom. This shaft is provided, near its ends, with two pinions 68 (see full and dotted lines Fig. 2), to the forward side of each of which a pin 70 is fixed (see dotted lines Fig. 3). The pins 70 engage lugs 72 (Fig. 2) which project downwardly from the inner side of the right-hand conveyer-frame, through suitable openings in the feed-table. These lugs have vertical slots to receive the pins. At its forward end the rock-shaft 64 is provided with an arm 74, and a hand-screw 76 is threaded into the end of this arm and projects through a slot 78 in an apron 80 depending at the rear end of the feed-table. The slot is concentric with the shaft 64, and after the lever 74 has been swung to any position permitted by the length of the slot, it may be clamped in such adjusted position by tightening the screw 76. When the shaft 64 is rocked by the action of the arm 74, the pins 70 impart a horizontal movement to the right-hand conveyer-frame 40, this movement being equal throughout the length of the frame, and after the frame has been so adjusted it may be fixed in position by tightening the clamp-screws 42.

In order that equal and opposite movements may be imparted to the left-hand conveyer-frame 40, each pinion 68 is arranged to mesh with a similar pinion 82 (Fig. 3) journaled beneath the feed-table, and the pinions 82 have pin-and-slot connections with the left-hand conveyer-frame similar to those between the pinions 68 and the right-hand frame.

It is also desirable, for reasons which will appear hereafter, to adjust the height of the lift-support 62 in changing from lifts of one size to another, and for this purpose, this support is mounted on two stems 90, which move vertically through openings in the feed-table, as shown in Figs. 2 and 3. Each stem 90 is slotted at the lower end, and engaged by the end of an arm 92, the arms 92 being fixed on a rock-shaft 84 journaled horizontally below the feed-table. At its rear end, the rock-shaft 84 is provided with an arm 86 carrying a hand-screw 88 which projects through a slot in the apron 80, as shown in Fig. 3. By means of this hand-screw, the shaft may be rocked and then fixed in adjusted position, so as to cause the arms 92 to support the stems 90 and, consequently, the lift-support 62 at various elevations.

As the lifts are removed one by one from the forward end of the stack, it is necessary to advance the stack intermittently to supply fresh lifts, and for this purpose, mechanism is employed which is shown particularly in Figs. 5 and 6. Each of the sprocket-wheels 46 on which the conveyer-chains are mounted is fixed on a vertical shaft 94, which turns in a bearing-sleeve 96 in the corresponding conveyer-frame. These sleeves and shafts project downwardly through suitable openings in the feed-table, and at the lower end of each shaft 94, a pinion 98 is fixed. Each of the pinions 98 engages one of two gears 100, and these gears mesh with each other, this arrangement of pinions and gears being employed to insure that the conveyers shall always move exactly in unison, so that the feed-pawls 54 on them shall always occupy positions exactly opposite each other and thus press the lifts forwardly in normal position. Since the shafts 94 must move toward and from each other when the conveyers are adjusted to feed lifts of different sizes, the pinions and gears just described are held in meshing relation by radius-links 104. The gears 100 are mounted on studs 102, which are connected with the shafts 94 by links 104, while the studs 102 are connected together by a link 106.

Intermittent rotation is imparted to the shafts 94 by means of automatic one-direction clutches. Each clutch comprises a disk 108, keyed to the corresponding shaft 90, and this disk is embraced in each case by a bifurcated arm 110, which rocks freely upon the shaft 94. Each arm 110 carries a block 112, having a recess in which a friction-roller 114 is carried, this roller being spring-pressed, as shown in dotted lines in Fig. 5, in a direction to cause it to pinch between the periphery of the disk 108 and the inclined bottom of the recess in the block 112, whenever the arm 110 is swung in the direction indicated by the arrows in Fig. 5. On the return-movement of the arm, the friction-roller slides freely over the disk.

During the return-movement of the feed-clutch, it is necessary to prevent retrograde movement of the shafts 94, and for this purpose, a clutch-disk 116, as shown in Fig. 6, is fixed to one of the gears 100. This disk coöperates with a spring-pressed friction-roller 118 arranged to move in a recessed block 120, fixed to the connecting link 106, and these parts are arranged to permit the gears 100 to move freely in the direction of the arrows applied to them in Fig. 5 but to prevent any retrograde movement of the gears.

To prevent the rocking movement of the links 104 under the influence of the retaining-clutch, the upper ends of the studs 102 are seated in openings in a plate 186, which is connected, by a pin 182, with one end of a distance-arm 180, the other end of the arm being connected, by a pivot 184, with the feed-table.

To impart a swinging movement to the clutch-arms 110, each arm is provided with a slide-block 122 (Fig. 5), engaging a transverse slot 124 in a T-shaped yoke 126. This yoke has a longitudinal slot 128, which engages a slide-block 130 fixed to the bottom of the feed-table and the yoke is thus guided to slide in the line of feed of the lifts. Movement is imparted to the slide-yoke by means of a lever 132, to which the forward end of the yoke is pivoted, this lever being mounted, at one end, on a pivot 134 beneath the feed-table. The other end of the lever 132 projects through an opening 136 (Fig. 2) in the right-hand side-flange of the table, and is connected with a rod 138 (Figs. 2 and 4). This rod slides loosely through a block 140 pivoted in the end of the lever 132, and a collar 142 is pinned to the rod so as to have positive engagement with the block in one direction of movement. A spring 144 is interposed between the block 140 and a collar 146 fixed at the rear end of the rod 138.

The forward end of the rod 138 is connected, by a pivot 148, with an arm 150 (Fig. 4), which is secured to a vertical sleeve 152 (Fig. 7). This sleeve is rotatable upon a rod 154, but is prevented from endwise vertical movement by engagement with upper and lower bearing-lugs 156 and 158, respectively, on the frame of the machine. As shown in dotted lines in Figs. 2 and 7, the sleeve 152 has an interior recess 160 which receives a sleeve 162 pinned to the rod 154, this sleeve being shorter than the recess 160 so that it may slide vertically therein. The sleeve 162 is provided with a rack 164, which projects outwardly through a vertical slot in the sleeve 152. The principal function of this rack will be described hereafter, but it operates, incidentally, as the means for transmitting, to the sleeve 152, a rocking movement of the rod 154. This rod, as shown in Fig. 1, extends downward to a bearing in a bracket 166 on the frame of the machine, and is there provided with a bevel-pinion 168, which is splined to the rod. This pinion is in mesh with a segmental gear (not shown), on an arm 170 of a lever which is shown in dotted lines in Fig. 1. This lever is pivoted on the bracket 166 and has a second arm 172, pivoted to a link 174. The link 174 is pivoted, in turn, to a cam-lever 176 which coöperates (in a manner which need not be particularly described) with one of the cams on the cam-shaft 34. The operation of this cam-mechanism is to swing the lever-arm 170 and thus oscillate the pinion 168 and the rod 154 at suitable times in the operation of the machine, whereby the rod 138 is moved forwardly and rearwardly so as to swing the lever 132 and thus impart movement to the chain-conveyers through the one-direction clutches above described. These movements are not positive in the direction of feed, but are imparted through the spring 144 on the rod 138. The purpose of this arrangement is to permit the provision of a movement of an amplitude at least equal to the greatest which may be required, in the case of the thickest heel-lifts, and to avoid the necessity of any adjustment of this amplitude for lifts of other thicknesses. Through means which will be described hereinafter, the forward movement of the stack of heel-lifts is arrested automatically at the point where the endmost lift is in the proper position to be seized by the transferring means, and when the stack has been moved to this extent, further movement of the rod 138 results merely in compressing the spring 144.

The heel-lifts are transferred, one by one, from the stack on the feed-table to the carrier by which they are carried to the operative instrumentalities of the machine, by means comprising a series of lift-pickers, four in number (see Figs. 8, 10 and 11). These pickers are generally of a type described in an application for Letters Patent of the United States filed by the present inventor November 1, 1915, Serial No. 59,031, relating to blank transferring mechanism, and they are not, therefore, claimed herein except in so far as their particular novel construction and mode of operation are concerned. Each picker comprises a shank 190, and three curved claws 193 which are pivotally mounted in radial slots in the outer end of the shank. These claws are of such form that they may be withdrawn entirely within the slots, or swung outwardly upon their pivots, in such a manner that their sharp points may be moved into engagement with, and bury themselves in, the face of a lift against which the picker is pressed. This operation of the claws is produced by the action of a slide 192 in the form of a sleeve which surrounds the shank 190, as shown best in Figs. 12 and 13.

The slides 192 are carried in four tangentially arranged sleeves 194, carried by a head 196 (Fig. 4) which is fixed in alinement with the stack of lifts, on the inner end of a shaft 198 journaled in a sleeve 200. This sleeve is fixed in a boss 201 on the frame of the machine. A gear 202 (Figs. 4 and 7) is fixed at the outer end of the shaft 198, and this gear coöperates with the rack 164 previously mentioned as attached to the sleeve 162 on the rod 154, this rack serving to impart intermittent rotation, through 90°, to the gear 202, the shaft 198 and the pickers.

The longitudinal movements of the rack 164 are produced by corresponding movements of the rod 154, and for this purpose, the rod is provided, at its lower end, with a grooved collar 206 (Fig. 1) which is engaged by the forked end of a lever 208 mounted on a pivot 210 on the frame of the machine. This lever has a depending arm 212, which is connected, by a link 214, with a cam-lever 216. A cam-roller 218, carried by the lever 216, engages a path in a cam 220 on the shaft 34, and thus the necessary rising and falling movements are imparted to the rod 154 at proper times in the operation of the machine.

The rack 164 engages the gear 202 during each downward movement of the rack, so as to rotate the gear in a counter-clockwise direction, as viewed in Fig. 7, but during the subsequent rising movement of the rack, it is disengaged from the gear by the rocking movement of the sleeve 152, which has been previously described, so that the rack rotates the gear only in one direction. To prevent any rotative movement of the gear 202 while it is not engaged by the rack 164, the sleeve 152 is provided with a locking-rack 204, which is rocked into engagement with the gear by the same movement of the sleeve which disengages the rack 164 from the gear, and thus the sleeves 194 are held rigidly in position while the pickers in them are engaging and disengaging the heel-lifts. This type of intermittent feed mechanism is not claimed specifically herein as it is claimed in my United States Patent No. 1,181,091, dated April 25, 1916.

After each quarter-revolution of the pickers, they are brought to rest with one picker in a horizontal position, and its end directed toward the end of the stack of heel-lifts on the feed-table, as shown in Fig. 8, while the next preceding picker is in vertical position, with its end directed downwardly, and a heel-lift supported thereby in position above a support, on which the lift is to be discharged as hereinafter described. With the pickers in this position, it is necessary to move their respective slides 192 so as to cause the first-mentioned picker to move into engagement with the endmost lift in the stack, and then retreat from the stack with said lift, and to cause the second mentioned picker to move downwardly, to deposit the lift held by it, and then to retreat out of engagement with said lift. To cause the movements just described, each slide 192 is provided with a bifurcated lug 222 (Figs. 8 and 12), which projects through a slot in the side of the sleeve 194 in which the slide moves. Each lug 222 is engaged by a roller 224 at one end of a lever 226 (Figs. 8 and 10), the lever being mounted, at its opposite end, to swing about a stud 228 on an adjacent sleeve 194. Each lever 226 is provided also with a roller 230, which travels in an annular slot 232 in the face of a disk 234 (Figs. 4 and 8) which is fixed on the inner end of the bearing-sleeve 200. This disk is provided with two gaps, which are normally filled by blocks 236 and 238, these blocks having slots normally continuous with the annular slot 232 in the disk, so that the rollers 230 may move freely into and out of the blocks when the pickers are rotated. When the pickers are stationary, however, as shown in Figs. 4 and 8, the rollers 230, on the levers 226 connected with the two pickers which are in operative positions, are in engagement with the blocks 236 and 238, and movement is imparted to these rollers by outward and inward movements of the blocks at this time. For this purpose, the block 236 is mounted on a bell-crank lever 240, pivoted on a fixed stud 242, while the block 238 is carried by a lever 244 pivoted on a fixed stud 246. A link 248 is pivoted to one arm of the lever 240, and to the lever 244, so that when the latter lever is swung to move the block 238, similar movements are imparted to the lever 240 and the block 236.

The lever 244 is actuated by means of a rod 250 pivoted, at its upper end, to the lever, the lower end of this rod being pivoted, as shown in Fig. 1, to a cam-lever 254. This lever coöperates with one of the cams on the cam shaft 34 in a manner which need not be particularly illustrated and described, except that it will be understood that at proper times in the operation of the machine the cam-lever is actuated to move the rod 250 first downwardly, and then upwardly, thus causing the blocks 236 and 238 to swing outwardly from, and then return to, their normal positions. By these movements the blocks cause the levers 226 to swing outwardly and then inwardly, thus causing outward and inward sliding movements of the slides 192.

The interior construction of the pickers is shown in Figs. 6 to 13. A compression-spring 195, coiled around the shank 190, causes the shank to advance with the slide 192. To limit this advancing movement, however, a rod 197 (Fig. 12) is fixed to the forward end of the shank, and has a stop-lug 199 at its rear end. This stop-lug engages two stationary stops 203 and 205 (Fig. 11) located alongside the picker-head in such positions as to arrest the picker in its lift-receiving and lift-discharging movements, respectively. The stop 205 is in the form of a spring-pressed plunger to cushion the shock of its engagement.

The claws 193 have arms which engage a groove in a stem 207 slidable in the shank 190. A head 209 (Fig. 13) fixed to the inner end of the stem, moves in a bore in the shank. A slide 211 moves in the inner end of the bore and is retained therein by a screw cap 256. A hook 257, pivoted in the slide 211, projects through a slot in the shank 190 and engages the slide 192 at the upper end of an opening 258 therein, as shown in Figs. 12 and 13. During the advance of the slide 192, after the shank 190 has been arrested by the stop above described, the slide continues to move, compressing the spring 195, and the hook 257 and the slide 211 are thus advanced within the shank. This causes the slide 211 to engage a spring 259 supported in a sleeve on the head 209, whereby the stem is advanced, thus throwing the claws into operative position. This movement is limited by a stop-sleeve 260 surrounding the stem.

At the end of the advance of the slide 211, a spring-pressed latch 261 snaps into an opening 262 in the shank 190 and acts to retain the claws in projected position while the picker is swung into the lift-discharging position, and the slide 192 then retreats, followed by the shank after the slide has reached and engaged the cap 256. During the relative movement of the slide 192 and the shank, which occurs at the beginning of this retreating movement of the slide 192, a relative movement between the slide and the hook 257 also occurs, owing to the fact that the slide 211 is retained stationary in the shank by the latch 261. From this it results that the beveled end of the hook is engaged and pressed inwardly by the end of the opening 258 in the slide 192. The hook is accordingly swung inwardly to a position in which it no longer coöperates with the slide 192, and it tends to remain in this position until restored by means hereinafter described.

Upon the next advance of the slide 192, with the picker in the discharging position, the shank 190 is advanced, and is arrested by the stop 205. The continued advance of the slide causes it to engage the beveled end of the latch 261, whereby the latch is swung in and disengaged from the shank 190. A spring 263, interposed between the head 209 and the shank, thereupon forces the head inwardly whereby the claws are retracted and the heel-lift released. At the same time the slide 211 is forced to its original position by a spring 264 interposed between the slide and the head. A dog 265 on the hook 257 is thus pressed against the cap 256, so as to swing the hook again into engagement with the slide 192.

Rotation of the shank 190 is prevented by a pin 266 projecting from the slide 192, into a slot in the shank, as shown in Figs. 12 and 14.

When a picker is pressed into engagement with the endmost heel-lift in the stack on the feed-table, it is necessary to hold the stack firmly to prevent it from yielding to the pressure of the picker, particularly where the stack is so long that the elasticity of the lifts in it would permit a considerable movement under such pressure. Accordingly, means are provided for clamping the lifts near the front end of the stack, the clamping-means acting upon the edges of these lifts. As shown in Figs. 4, 8, 9 and 11, two clamps 268 are arranged on opposite sides of the stack at this point, these clamps being provided with clamp-jaws 270 which are serrated on their lift-engaging surfaces. In order that the clamp-jaws may conform to the inclination of the edges of the lifts and may be adjusted to suit lifts of different forms and sizes, they have cylindrical outer surfaces engaging concave sockets in the clamp-bodies 268, and the clamp-jaws are adjustably secured in these sockets by bolts 272 projecting through vertical slots in the clamp-bodies.

While the lifts near the end of the stack may be clamped for the purpose described, it will be apparent that the end-most lift, which is to be seized and removed by the picker, cannot be so clamped, but must be held yieldingly. Accordingly, each clamp-jaw is provided with a set of leaf-springs 274, seated in a slot in the face of the jaw and held therein by the bolt 272, as shown in Fig. 9, and the inner extremities of these springs are bent, as shown in Fig. 4, so as to engage the lateral edges of the endmost lift and hold this lift yieldingly, enabling it to be readily withdrawn by the picker.

To guide the clamp-bodies 268 in their in and out movements, they are provided with upwardly extending arms 276, which are bifurcated to engage a guide-bar 278 along which they may slide, this bar being carried in brackets 280 on the frame of the machine. To support the clamp-bodies and actuate them, they are each provided, at the bottom, with a sleeve 282, and these sleeves have threaded engagement with left and right-hand screws 284 and 286, respectively, on a horizontal shaft 288 which turns in bearings on the feed-table (see Fig. 9). One end of the shaft 288 is provided with a pinion 290, which meshes with a rack 292 (Figs. 1 and 2), this rack being integral with a sleeve 293 which is carried by a vertical slide-rod 294. This rod moves in bearing-lugs 298 on the frame of the machine, and it is keyed to the upper bearing to prevent it from turning. The lower end of the rod 294 is pivoted to a rod 296, near the lower end of which a sleeve 299 is slidingly mounted. This sleeve is pivoted to a bell-crank lever 300, which is articulated with a cam-lever 302 pivoted on the frame of the machine. The lever 302 carries a cam-roller engaging one of the cams on the cam-shaft 34. Below the sleeve 299, a collar 306 is fixed on the rod 296, and a spring 308 is interposed between the sleeve and a second collar 310 fixed on the rod. The cam-mechanism operates, at suitable times, to swing the lever 300 upwardly, thus causing it, through the pressure of the spring 308, to raise the rods 296 and 294 and the rack 292. Thus the pinion 290, and the shaft 288 and the screws thereon are rotated in a direction to move the clamp-jaws 270 toward each other and cause them to grip the heel-lifts, this movement being arrested, when the lifts have been clamped with the requisite force. Further movement of the cam-lever 300 is absorbed by the compression of the spring 308. As soon as the endmost lift has been removed from the stack by the picker, opposite movements of these parts occur, whereby the lifts are unclamped to permit the stack to be advanced so as to press the next lift beyond the clamp-jaws 270 and into engagement with the springs 274.

The range of movement of the clamp-jaws 270 toward and from each other, as imparted by the mechanism just described, is only sufficient to insure that the lifts shall be properly clamped and unclamped, but when the feed-mechanism is adjusted to fit heel-lifts of different sizes it is necessary to adjust the normal distance between the clamp-jaws. To permit this, the sleeve 293 is mounted on the rod 294 in such a manner that it may be swung around this rod to disengage the rack 292 from the pinion 290. For this purpose, the sleeve is normally fixed on the rod by a set-screw 312 (Fig. 1) and when this screw is loosened the rack may be swung out of engagement with the pinion. The shaft 288 may then be turned by means of a knurled hand-wheel 314 (Fig. 9) on its outer end, so as to screw the clamp-jaws 270 toward or from each other through the required distance. The rack may then be again engaged with the pinion.

As stated in connection with the description of the operation of the feed-conveyers, it is necessary, in advancing the stack between these conveyers, to arrest the advancing movement when the endmost lift is in position to be seized by a picker. For this purpose, two abutments are employed, in the form of stop-fingers 316, shown particularly in Figs. 4, 8 and 9. These fingers constitute arms of bell-crank levers which are mounted on pivots 318, these pivots being supported by lugs 320 fixed to the feed-table. Each of the bell-crank levers is provided with a second arm 322, these arms 322 projecting toward each other and terminating in segmental gears 324, which mesh with each other and thus cause the stop-fingers 316 to have simultaneous inward and outward movements. The fingers are actuated by a link 326, connected to one of the arms 322, as shown in Fig. 9, the lower end of this link being pivoted to an arm 328, which is fixed on a rod 330. The rod slides vertically in a bearing-block 332 on the frame of the machine. A spring 334 surrounds the rod, and bears against the block 332 and against a collar 336 fixed on the rod. This spring tends to force the rod downwardly, so as to cause the stop-fingers 316 to be swung, from the position shown in Fig. 9, to a position in which they are in front of the stack of heel-lifts. The rod is normally held in the raised position of Fig. 9, however, by engagement of its lower end with a beveled surface 338 on the end of an arm 340 carried by the rocking-rod 154 (Figs. 1 and 9) and the movements, previously described, of the rod 154 are such as to cause the stop-fingers to be moved into and out of operative position at suitable times in the operation of the feed-mechanism.

The heel-lifts are discharged by the pickers upon the carrier 30 of suitable form, that serves to transfer the lifts to the operative instrumentalities by means of which the lifts are gaged and subsequently sorted into suitable receptacles. These instrumentalities form no part of the present invention; nor does the carrier 30, except in the broad sense of constituting an element upon which the lifts are deposited through the agency of the automatic feed-mechanism.

The pickers are arranged to place the heel-lifts upon the carrier in a definite position, which is rendered possible by reason of the fact that the position of the lifts in the stack in the feed-table is accurately determined by the adjustable feed-mechanism, and that the pickers seize the lifts and hold them positively until they are deposited on the carrier. Thus, the position of each lift in the carrier bears a definite and predetermined relation to the position which each lift occupied in the stack. Owing to this arrangement, a carrier having merely a smooth horizontal surface upon which the lifts are deposited may be employed, such a carrier being suitable for lifts of all sizes and shapes without the provision of any means, adjustable or otherwise, for determining the position in which the lifts are received by the carrier.

Although the invention has been set forth as embodying more or less specific structural details and arrangement and location of parts, it will be understood that the invention is not restricted in these respects but may be modified materially without departing from the spirit or scope of the invention, and therefore only such limitations should be imposed as are indicated in the appended claims.

The nature and scope of the present invention having thus been indicated and the preferred embodiment of the invention having been specifically described, that which is claimed as new is:

1. A machine for operating on pieces of sheet material having, in combination, means for supporting a stack of said pieces; a picker for seizing the endmost piece and withdrawing it from the stack; yielding means for holding the endmost piece while so seized; and means operable intermittently to clamp the edges of some of the pieces in the rear of the endmost piece and support the latter against the pressure of the picker.

2. A machine for operating on pieces of sheet material having, in combination, means for supporting a stack of said pieces; a picker for seizing the endmost piece and withdrawing it from the stack; clamp-jaws arranged to engage the edges of the pieces near the end of the stack; and means for connecting and relatively actuating the clamp-jaws, said means being adjustable to vary the normal distance between the jaws in accordance with the size of the pieces.

3. A machine for operating on pieces of sheet material having, in combination, means for supporting a stack of said pieces, a picker for seizing the endmost piece and withdrawing it from the stack; clamp-jaws arranged to engage the edges of the pieces near the end of the stack; means for connecting and relatively actuating the clamp-jaws, said means being adjustable to vary the normal distance between the jaws in accordance with the size of the pieces; and yielding means for engaging and holding the endmost piece of the stack, said means being connected and adjustable with the clamp-jaws.

4. A machine for operating on pieces of sheet material having, in combination, means for supporting a stack of said pieces; a picker for seizing the endmost piece of the stack; clamp-jaws arranged to engage the side edges of some of the pieces in the stack; and means for moving the clamp-jaws toward and from each other, the jaws being angularly adjustable in accordance with the relative inclination of the side edges of the pieces.

5. A machine for operating on pieces of sheet material having, in combination, means for supporting a stack of said pieces; a picker for seizing the endmost piece of the stack; clamp-jaws arranged to engage the side edges of some of the pieces in the stack; springs connected with the clamp-jaws and projecting beyond them so as to engage the edges of the endmost piece of the stack and support it beyond the clamp-jaws; and means for moving the clamp-jaws toward and from each other in timed coöperation with the movements of the picker.

6. A machine for operating on pieces of sheet material having, in combination, a horizontal support for said pieces; means for holding a stack of said pieces in a substantially horizontal position with the individual pieces standing on edge; transferring means operating to seize the endmost piece of the stack, swing it into horizontal position and deposit it upon the support in a position having a definite relation to that occupied by the piece when in the stack, and means engaging the stack near the forward end thereof for firmly supporting the endmost piece against the pressure of the transferring means during the seizing operation.

7. Feed-mechanism for pieces of sheet material, comprising means for supporting a stack of said pieces and for advancing the stack by positive engagement with the sides thereof, and means associated with said means to permit any portion of the stack to be moved forwardly with respect to said means.

8. Feed-mechanism for pieces of sheet material, comprising means for supporting a stack of said pieces and for advancing the stack by positive engagement with the sides thereof, said means being yieldable to permit the introduction of pieces to the stack in the direction of movement of the stack.

9. Feed-mechanism for pieces of sheet material, comprising means for supporting a stack of said pieces, and for advancing the stack by positive engagement with the sides thereof, said means being open in the rear of the last piece of the stack to permit the free introduction of additional pieces.

10. Feed-mechanism for pieces of sheet material, comprising a plurality of endless conveyers, between which a stack of said pieces may be placed, the conveyers being arranged to advance the stack by positive engagement with the sides thereof, and means for adjusting the spacing of said conveyers to accommodate different sizes of pieces.

11. Feed-mechanism for pieces of sheet material, comprising a plurality of endless conveyers, between which a stack of said pieces may be placed, a plurality of pawls associated with said conveyers for advancing the stack by engagement with the sides thereof, said pawls being yieldable to permit the introduction of pieces to the stack.

12. Feed-mechanism for pieces of sheet material, having, in combination, stationary means for supporting a stack of said pieces in substantially horizontal position by engagement with the lower portions thereof, means for advancing the stack by engagement with the sides only thereof, stationary guiding means for engaging the sides of the stack, and means for laterally adjusting both of said last named means.

13. Feed-mechanism for pieces of sheet material having, in combination, means for supporting a stack of said pieces; and means for advancing the stack, comprising a plurality of piece-engaging members, movable successively through the space occupied by the stack, and adapted to yield in the direction of advance of the stack to permit the introduction of additional pieces to the stack.

14. Feed-mechanism for pieces of sheet material having, in combination, a pair of horizontally disposed chain conveyers between which a stack of said pieces may be held, the conveyers extending the full length of the stack and being arranged to advance the stack by engagement with the sides thereof; and adjustable connections between the conveyers to vary the distance between them in accordance with the width of the pieces.

15. A machine for operating on pieces of sheet material having, in combination, means for supporting a stack of said pieces; means for seizing the endmost piece and removing it from the stack; and means for yieldingly holding the endmost piece and firmly clamping the adjacent lifts during the seizing operation.

16. A machine for operating on pieces of sheet material having, in combination, means for supporting a stack of said pieces; and means for yieldingly holding the endmost piece in the stack and firmly clamping the lifts adjacent thereto.

17. A machine for operating on pieces of sheet material having, in combination, means for supporting a stack of said pieces; means for clamping the edges of the pieces near the end of the stack; and means for adjusting said clamping means to accommodate different sizes of pieces.

18. A machine for operating on pieces of sheet material having, in combination, means for supporting a stack of said pieces; means for clamping the edges of the pieces near the end of the stack; means for yieldingly holding the endmost piece in the stack; and means for concurrently adjusting said clamping means and said yielding holding means to accommodate different sizes of pieces.

19. A machine for operating on pieces of sheet material having, in combination, means for supporting a stack of said pieces; and self-adjustable means disposed on opposite sides of the stack for concurrently clamping the side edges of some of the pieces in the stack, said means being adapted to accommodate themselves to the relative inclinations of the side-edges of the pieces that are clamped.

20. A machine for operating on pieces of sheet material having, in combination, means for supporting a stack of said pieces; means for clamping the side edges of some of the pieces in the stack; and resilient means associated therewith for engaging the side-edges of the endmost piece and yieldingly supporting it in position.

21. A machine for operating on pieces of sheet material having, in combination, means for supporting a stack of said pieces; a support disposed parallel to the plane of the stack, means adapted to retain control of the pieces for transferring the endmost pieces from said stack and depositing them upon said support in positions having a definite relation to those occupied by the pieces in the stack, and means acting in timed-cooperation with the transferring means for engaging the forward end of the stack and clamping the engaged pieces in position.

22. Feed mechanism for pieces of sheet material having, in combination, means for supporting a stack of said pieces; a pair of continuously operating endless chains arranged along the opposite sides of the stack; a plurality of pawls pivotally associated with each chain at spaced intervals; and means for yieldingly positioning said pawls in engagement with the sides of the stack, whereby said stack is advanced, said yielding means permitting the free introduction of additional pieces to the rear of the stack.

23. Feed mechanism for pieces of sheet material having, in combination, means for supporting a stack of said pieces; and means engaging the opposite sides of certain pieces that are disposed at intervals in the stack for positively advancing the stack in independent groups of pieces, said means being adapted to permit any portion of the stack to be moved forward with respect thereto.

24. Feed mechanism for pieces of sheet material having, in combination, means for supporting a stack of said pieces, means for advancing the stack by positive engagement with the sides thereof, and means coöperating with said last means for permitting the introduction of any number of additional pieces to the rear end of the stack without interrupting the continuity of the feeding operation.

25. A machine for operating upon pieces of sheet material having, in combination, means for holding a stack of said pieces; a rotatable device comprising a plurality of pickers; means for intermittently rotating said device to successively position the pickers opposite the end of the stack, and means operative during periods of rest of said rotatable device for causing the oppositely positioned picker to grasp and remove the endmost piece of the stack.

26. A machine for operating upon pieces of sheet material having, in combination, means for holding a stack of said pieces; a rotatable device comprising a plurality of pickers; and means for intermittently rotating said device to position the successive pickers opposite the end of the stack and during periods of rest of said rotatable device for actuating the pickers so positioned to grasp and remove the successive endmost pieces of the stack, said means also serving to transfer the pieces and effect their discharge from the pickers.

27. A machine for operating upon pieces of sheet material having, in combination, means for holding a stack of said pieces; a rotatable device comprising a plurality of associated angularly arranged pickers disposed adjacent one end of the stack, and mechanical means for actuating one of the pickers to cause it to grasp the endmost piece in the stack and for concurrently causing another picker to release a previously grasped piece.

28. A machine for operating upon pieces of sheet material having, in combination, means for holding and feeding a stack of said pieces; a movable table; a rotatable device comprising a plurality of angularly arranged pickers; means for intermittently rotating said device to position the successive pickers for receiving the successive pieces and transferring them to a depositing position adjacent said movable table; and means operable during periods of rest of said rotatable device to cause the successive pickers to grasp the successive pieces at one end of the stack and to deposit them upon said movable table.

29. A machine for operating upon pieces of sheet material, having, in combination, means for holding a stack of said pieces; a rotatable device comprising a plurality of angularly disposed longitudinally movable pickers; means for intermittently rotating said device to successively bring one of the pickers adjacent to the endmost piece in the stack and another picker in a position of discharge; and means for longitudinally actuating the last mentioned pickers to cause them respectively to grasp said endmost piece and to release a previously grasped piece.

30. A machine for operating upon pieces of sheet material having, in combination, means for holding a stack of said pieces; a rotatable device comprising a plurality of angularly disposed longitudinally movable pickers; means for intermittently rotating said device to successively bring one of the pickers adjacent to the endmost piece in the stack and another picker in a position of discharge; actuating means associated with each of the pickers and in coöperative engagement with a common cam path having gaps therein; movable members for filling said gaps and having paths that normally form continuations of said common cam path; and means for periodically moving said movable filling members out of said gaps to cause said actuating means to longitudinally advance the picker adjacent said stack into engagement with the endmost piece thereof, and to simultaneously actuate the picker in the discharge position to release a previously grasped piece.

31. Picker mechanism comprising a rotatable member having a plurality of angularly disposed longitudinally movable pickers; means for periodically rotating said member; actuating means associated with each picker and each including a cam roll; a cam provided with a cam path to receive all of said cam rolls, said path having a plurality of gaps therein; movable members for normally filling said gaps and having cam paths forming continuations of said common cam path; means for periodically moving said filling members out of said gaps to effect a longitudinal actuation of the picker members having the cam rolls of their respective actuating means disposed in coöperative engagement with the movable filling members.

32. A machine for operating upon pieces of sheet material having, in combination, means for supporting a stack of said pieces; means for advancing the stack; a stop finger rotatable about an axis parallel to the stack disposed at one end of the stack and adapted to be periodically rotated into position to be engaged by and support the endmost pieces of the stack, and means for periodically removing said endmost pieces.

33. A machine for operating upon pieces of sheet material having, in combination, means for holding a stack of said pieces; a multiple picker device intermittently rotatable about an axis normal to the axis of the stack and comprising a plurality of independent longitudinally movable pickers; and means operable during periods of rest of said rotatable device for actuating said pickers successively to cause them to engage and remove pieces from one end of the stack.

34. A machine for operating upon pieces of sheet material having, in combination, means for holding a stack of said pieces; a rotatable multiple picker device comprising a plurality of independent longitudinally movable pickers; means for longitudinally actuating said pickers in succession in opposite directions to cause them to engage and remove pieces from one end of the magazine.

35. A machine for operating upon pieces of sheet material having, in combination, means for holding a stack of said pieces; a rotatable multiple picker device disposed adjacent one end of the stack and comprising a plurality of angularly arranged and longitudinally movable impaling pickers; and means for actuating said pickers in succession in one direction to cause the pickers to impale the endmost pieces in the stack, and in the opposite direction to remove the impaled pieces from the stack.

36. A machine for operating upon pieces of sheet material having, in combination, means for holding a stack of said pieces; a rotatable multiple picker device disposed adjacent one end of the stack and comprising a carrier having a plurality of angularly disposed openings therein, and pickers slidably disposed in said openings and projecting outwardly therefrom; and means for longitudinally actuating the picker opposite the stack to cause it to grasp the endmost piece in the stack.

37. A rotatable multiple picker device comprising a carrier having openings therein, pickers slidably mounted in said openings, and means for longitudinally projecting said pickers outwardly from said openings to grasp a blank and for withdrawing said pickers inwardly to disengage the grasped blank.

38. A machine for operating on pieces of sheet material having, in combination, means for supporting a stack of said pieces, movable devices disposed on opposite sides of the stack for clamping the opposite edges of the pieces near one end thereof; and means for concurrently adjusting said clamping devices to accommodate different sizes of pieces.

39. A machine for operating upon pieces of sheet material having, in combination, means for holding a stack of said pieces; a supporting member; and an intermittently rotatable multiple picker device comprising a plurality of angularly arranged longitudinally movable pickers for transferring the successive pieces from the holding means to said supporting member, means for longitudinally actuating the successive pickers to cause them to grasp and remove the endmost pieces of said stack and after rotational steps of said device for longitudinally actuating said pickers to deposit the pieces on said supporting member and disengage said pieces.

ERASTUS E. WINKLEY.